United States Patent [19]

Konneker

[11] Patent Number: 4,752,951
[45] Date of Patent: Jun. 21, 1988

[54] METHOD OF PROVIDING LOCATION DEPENDENT PERSON LOCATOR SERVICE

[76] Inventor: Lloyd K. Konneker, 1810-A Ashborough Rd., Marietta, Ga. 30067

[21] Appl. No.: 811,991

[22] Filed: Dec. 23, 1985

[51] Int. Cl.[4] .......................... G08B 5/22; H04M 3/42; H04M 11/00
[52] U.S. Cl. ............................. 379/211; 340/825.44; 340/825.49; 379/57
[58] Field of Search ................... 379/57, 104, 106, 94, 379/93, 157, 156, 217, 211, 215, 374, 48, 41, 201, 210; 340/825.49, 825.44

[56] References Cited

U.S. PATENT DOCUMENTS

| | | | |
|---|---|---|---|
| 3,506,791 | 4/1970 | Halaby | 379/210 |
| 3,739,329 | 6/1973 | Lester | 367/6 |
| 4,209,787 | 6/1980 | Freeny, Jr. | 342/457 |
| 4,275,385 | 6/1981 | White | 340/825.49 |
| 4,313,035 | 1/1982 | Jordan et al. | 379/207 |
| 4,649,385 | 3/1987 | Aires et al. | 379/57 |
| 4,658,416 | 4/1987 | Tanaka | 379/57 |
| 4,680,785 | 7/1987 | Akiyama et al. | 379/57 |

FOREIGN PATENT DOCUMENTS

| | | | |
|---|---|---|---|
| 2541020 | 8/1984 | France . | |
| 0164361 | 9/1983 | Japan | 379/210 |
| WO82/04491 | 12/1982 | PCT Int'l Appl. | 379/211 |

Primary Examiner—Thomas W. Brown

[57] ABSTRACT

A method is disclosed of using a subscriber location indicating system and a telephone switch to provide location dependent person locator telephone service for called subscribers. In accordance with the service, a called party may provide that a call directed to a personal number unique to the called party be completed in different manners according to the location of the called party when the call is made. A subscriber location indicating system tracks subscribers and provides the location of subscribers to a database. A telephone switch where a call is initiated sends the personal number unique to the called party to the data base. Information that depends on the present location of the called party and that specifies how the call is to be completed is returned to the telephone switch, and the call is completed accordingly.

3 Claims, 4 Drawing Sheets

FIG. 4

LOCATION DEPENDENT PERSON LOCATOR MEMORY TABLE
PIN 583-1000

| ROW | |
|---|---|
| 0 | CURRENT LN |
| 1 | PIN - 9446 |
| 2 | DEFAULT CALL COMPLETION STATUS <br> UNAV \| PAF \| ... |
| 3 | LOCATION DEPENDENT CALL COMP. STATUS <br> UNAV \| PAF \| ... |
| ⋮ | ⋮ |
| N | LOCATION DEPENDENT CALL COMP. STATUS <br> UNAV \| PAF \| ... |

METHOD OF PROVIDING LOCATION DEPENDENT PERSON LOCATOR SERVICE

TECHNICAL FIELD

The invention pertains to telephone systems in general, and particularly to the provision of a new telephone service whereby a subscriber may control the completion of calls directed to the subscriber. In particular, the method allows a subscriber to control the completion of calls based on the location of the subscriber when a call directed to the subscriber is made.

BACKGROUND OF THE INVENTION

It has long been considered desirable to allow telephone subscribers as much control as possible in the processing of calls, thereby reducing the need for operators and enhancing the privacy of telephone communications. In particular, it is desirable for called parties to be able to control the disposition of calls directed to them. For example, the service known as call-forwarding allows a subscriber to control the diversion of calls to telephone stations other than the station at which the called party normally resides. A person locator service taught in Jordan and Weber U.S. Pat. No. 4,313,035 provides subscriber control of a host of other services.

In general, the arrangements described above allow a subscriber to make an update call to a data base to store a call completion status that will then direct the completion of calls directed to the subscriber. The arrangements described above are limited in that one call completion status is usually only useful while the subscriber is in one location. It is inconvenient to require the subscriber to update his status at the data base whenever the subscriber changes location.

SUMMARY OF THE INVENTION

The aforesaid problem has been solved in a method of providing location dependent person locator service. The method is implemented in a stored program controlled telephone system having a database, a data communications network interconnecting the database with telephone switching offices, and a data communications network interconnecting the database with a subscriber location indication system. Information specifying the status of the subscriber for call completion is stored at the data base. The information includes a status for call completion for the subscriber for each of a plurality of locations at which the subscriber might be located. The status information at the database under the control of the subscriber specifies in general a method in which a call to the subscriber is to be completed. The information may be modified at any time over a telephone and data communications network connection under direct control of the subscriber. Information giving the location of the subscriber is also stored at the data base. Information in the data base giving the location of the subscriber is updated by the subscriber location indicating system over a data communication network.

In response to a call directed to the subscriber, the data base is addressed to determine the location of the subscriber. Upon determination of the location of the subscriber, the data base is again addressed to determine the status of the subscriber for call completion at said location. If the status of the subscriber for call completion indicates that the subscriber is at a location where the subscriber desires to be rung on the station at which the subscriber normally resides, the call is completed to the station at which the subscriber normally resides. If the status of the subscriber for call completion indicates that the subscriber is at a location where the subscriber desires to be paged, the subscriber is paged. If the status of the subscriber for call completion indicates that the subscriber is at a location where the subscriber is unavailable for calls, the calling party is informed of the unavailability of the subscriber. Many other methods of call completion may be provided.

BRIEF DESCRIPTION OF THE DRAWINGS

FIG. 4 shows one illustrative layout of a memory table located at the data base of FIG. 1 and containing location information and other information pertaining to one subscriber of location dependent person locator service.

DETAILED DESCRIPTION

Figure 1:
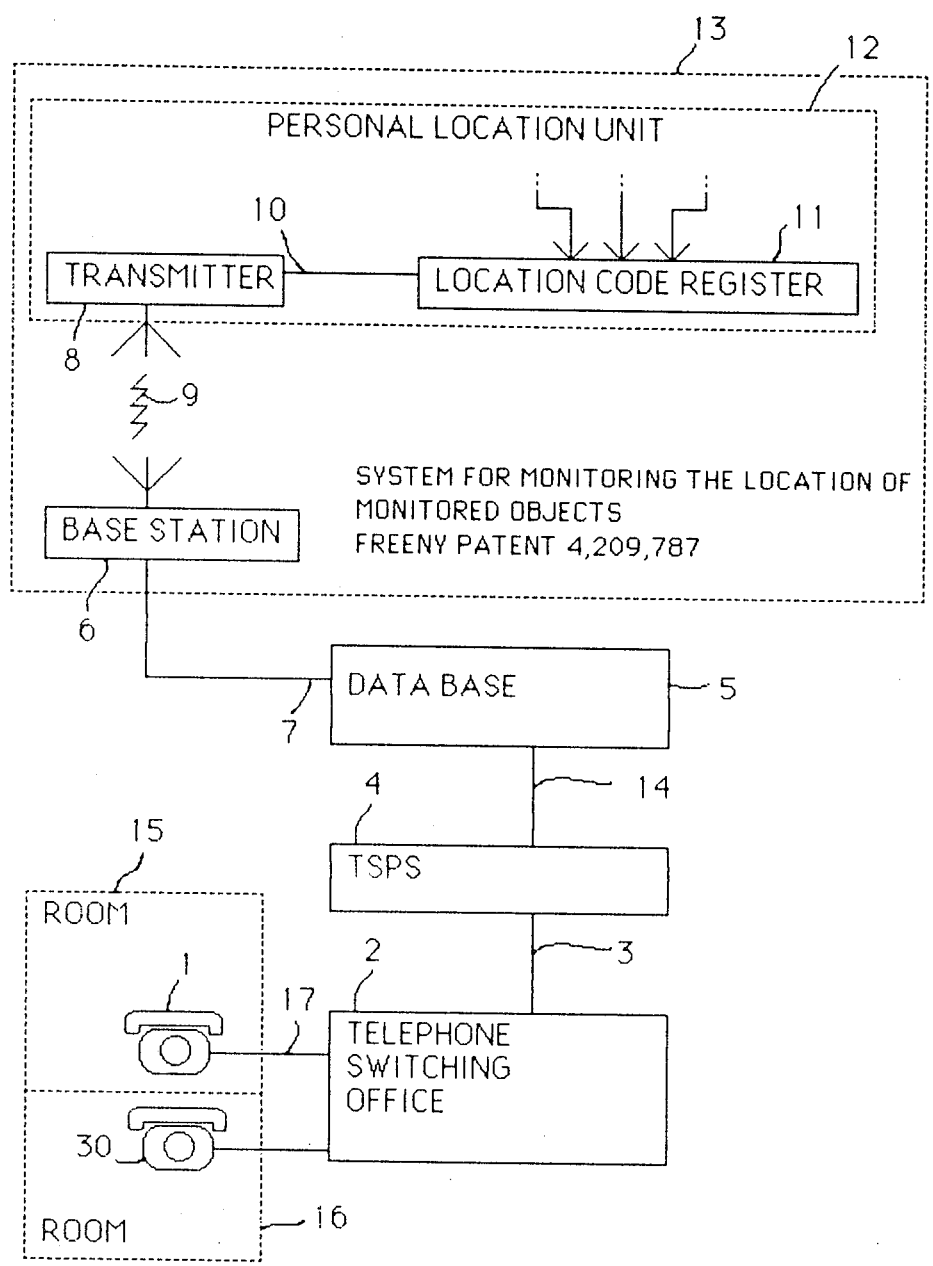
FIG. 1 shows, in block diagram form, a configuration of a telephone switching office, a data base, a subscriber location indicating system, and signal transfer facilities for serving location dependent person locator calls.

The location dependent person locator service is generally shown in FIG. 1 and, in general, includes: a subscriber location indicating system 13; a data base 5; a data communication network 7 interconnecting said subscriber location indicating system and said data base; a Traffic Service Position System (TSPS) 4; a data communication network 14 interconnecting said data base and said TSPS; a telephone switching office 2; a data communication network 3 interconnecting said TSPS and said telephone switching office; and a plurality of telephone stations 1. The subscriber location indicating system 13, for example, may be such as the System for Monitoring the Location of Monitored Objects taught by Freeny U.S. Pat. No. 4,209,787, comprising in part a plurality of personal location units 12 and a base station 6. The data base 5, by way of example, may comprise a Western Electric Company, Inc., 1 A processor (disclosed in Bell System Technical Journal No. 7, February 1977), equipped with disk storage and a system of programs to establish, edit, interpret, and manage information stored in memory.

With reference to FIG. 1, the method is described by assuming that a subscriber A subscribes to location dependent person locator service and is beginning a new job in a building in which the location dependent person locator service is provided. Subscriber A has assigned to him a Person Locator Number (PLN) which is unique to him. We assume subscriber A has been assigned to work in room 15 with telephone station 1 and that subscriber A also might occasionally work in room 16. Each of rooms 15 and 16 are assigned a Location Number (LN), which uniquely identifies the locus of the room within the area monitored by subscriber position indicating system 13. Illustratively, the location number is assumed to be a three digit number, the location number of room 15 is assumed to be 222, and the location number of room 16 is assumed to be 223.

Prior to commencing work, subscriber A might wish to provide that all calls directed to him while he is in room 15 be completed with an announcement to the caller that subscriber A is unavailable. To arrange this, subscriber A initiates a call completion update call.

Assuming the call is placed at station 1 connected by line 17 to telephone switching office 2, subscriber A keys in a "0" followed by the digits "700", his PLN, in this example 583-1000, a Personal Identification Number (PIN), the LN for room 15, in this example 222, and a three digit access code. The "700" digits identify this call as involving person locator service. This is one illustrative way of identifying such calls. The PIN is assigned to subscriber A at the time of subscription to LDPL service and is assumed to be the digits "9446"; the PIN is correlated with the unique PLN for verification as will be seen. The access code identifies the call as a certain type of LDPL update call and may, as assumed here, consist of the digits "111" for an unavailable call completion update call. The call is keyed in and routed from the telephone switching office to TSPS 4 as is taught in Jordan and Weber U.S. Pat. No. 4,313,035. TSPS 4 transmits a data message copmrising the dialed information to a data base 5 as is also taught in Jordan and Weber U.S. Pat. No. 4,313,035.

Data base 5 recognizes from the "700" digits that the received data pertains to a Location Dependent Person Locator (LDPL) type of call. Accordingly, program control is given to a location dependent person locator control program which is flowcharted in FIGS. 2 to 3. Program execution begins at program address LDPLSTART in FIG. 2.

Each subscriber whose location dependent person locator records are maintained in data base 5 has assigned a memory table in the data base memory. One illustrative organization of such a table for subscriber A is shown in FIG. 4. The address of the memory table is derived by the data base from the PLN. The first row of the table in FIG. 4 contains a Current Location Number (CLN) identifying the location at which subscriber A is presently located. The second row contains the subscriber PIN, here assumed to be 9466. The third row contains a default status for call completion to be used in the event that subscriber A has not provided a call completion status for some location, as will be seen. The remainder of the table comprises one Location Dependent Call Completion Status (LDCCS) row for each location for which subscriber A wishes to specify a call completion status. The address of each LDCCS row of the memory table is derived by the data base from the LN. Each LDCCS row contains a number of control flags which direct the data base program and words indicating how calls to subscriber A are to be completed. Any number of such flags and words having any desired meaning may be provided. For example, the call completion methods of call forwarding, paging, auto callback, and voice messaging may be specified.

Figure 2:
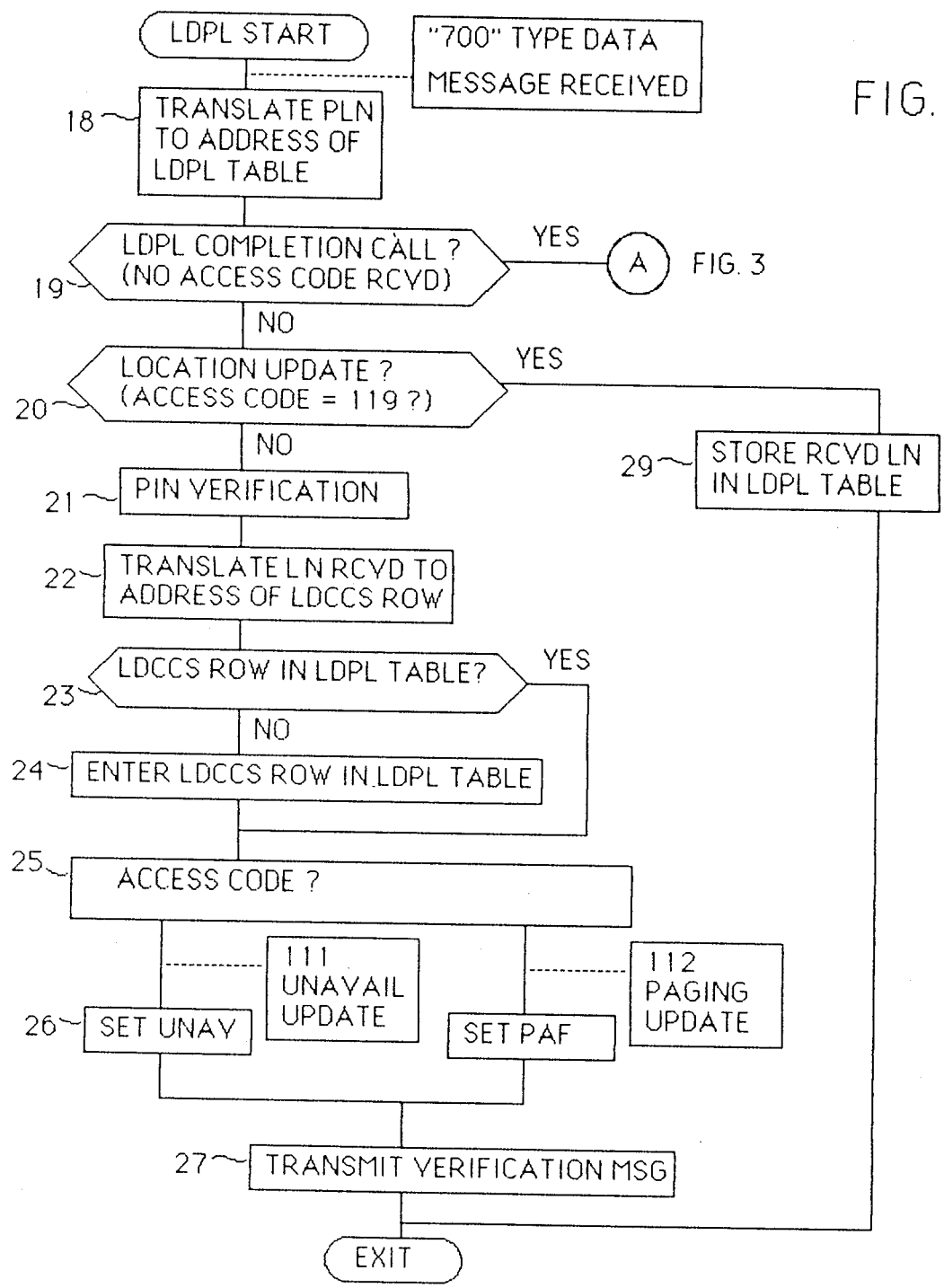
FIGS. 2 to 3 show illustrative flow diagrams of a location dependent person locator program at the data base of FIG. 1.
Figure 3:
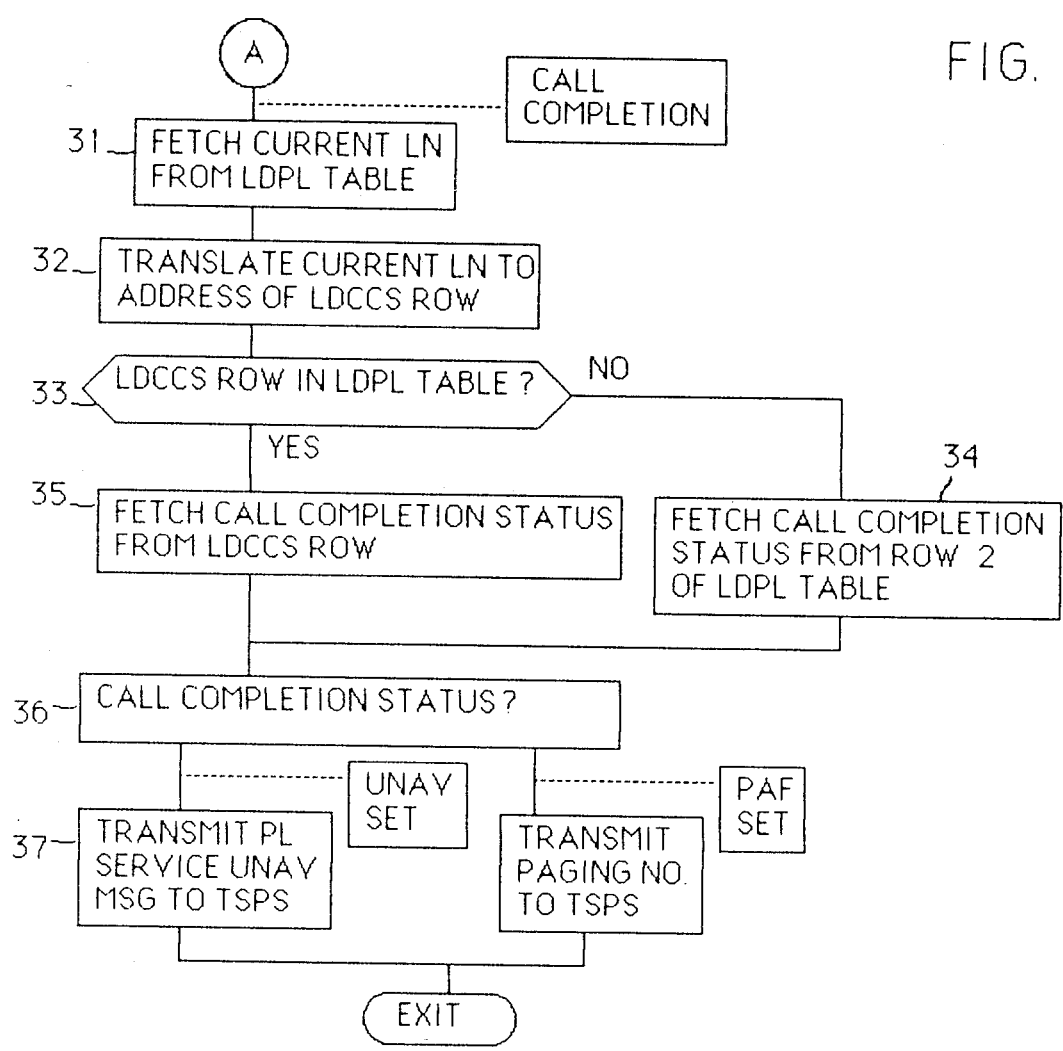

With reference again to our example in which subscriber A is placing a call completion update call, in FIG. 2 the LDPL program first translates at designation 18 the received PLN 583-1000 into a memory address which is the address of the LDPL table in FIG. 4. Next, at designation 19 the access code received from TSPS 4 is examined to determine if this call is a completion call (no access code received), which is a call being placed to subscriber A from another party. Since the call in question is a call completion update call from subscriber A, this test fails. At designation 20, the program examines the access code to determine if this is a location update (access code equal to "119".) Since the call in question is a call completion update call from subscriber A, this test fails. At designation 21, the program next verifies that an authorized party is making the update call, as is taught for example in Jordan and Weber U.S. Pat. No. 4,313,035. Here it is assumed that the update call is verified, and the program goes on to translate at designation 22 the received LN 222 into a memory address which is the address of the LDCCS row in the LDPL table.

The result of the translation at 22 of the received LN into a LDCCS row address may be a null address, which indicates that the LDCCS row is not in the table. At designation 23 the program determines whether the LDCCS row is in the LDPL table by comparing the LDCCS row address with the null address. Here it is assumed that the LDCCS row is not already in the table, and at designation 24 the program goes on to enter a LDCCS row for received LN 222 into the table in FIG. 4 and continues to designation 25. If the LDCCS row is already in the table in FIG. 4, the program simply continues to designation 25. At designation 25, the program interprets the received access code, as is taught for example in Jordan and Weber U.S. Pat. No. 4,313,035. The result of interpreting the access code at designation 25 is stored in the LDCCS row for LN 222. In this example, since the access code is the digits "111", the UNAV flag in the LDCCS row is set by the program at designation 26.

Finally at designation 27, the LDPL program formulates a verification message and transmits it to TSPS 4. The verification message includes an indication that the update has been performed. At this point all data base operations pertaining to the call are completed. The LDPL program releases control at EXIT to the main control program of the data base.

Suppose that subscriber A also wishes to provide that all calls directed to him while he is in room 16 be completed by paging subscriber A. To arrange this, subscriber A makes a second call completion update call in a manner similar to that described above. Subscriber A may make a call completion update call for every location number representing locations that subscriber A reasonably might expect to frequent.

Suppose also that subscriber A wishes to provide a method of call completion for all calls directed to him while he is in all other locations for which he has not specifically provided a call completion status in the data base. To arrange this, subscriber A makes yet another call completion update call in a manner similar to that described above except that subscriber A keys in a special LN which translates into the address of the default call completion status in the third row of the LDPL table.

Suppose also that subscriber A wishes to provide a method of call completion for all calls directed to him while he is out of the area monitored by subscriber location indicating system 13. To arrange this, subscriber A makes yet another call completion update call in a manner similar to that described above, except that subscriber A keys in a special LN which signifies the set of all locations outside the area monitored by subscriber location indicating system 13.

The method described above is one illustrative way of updating the data base; other ways are possible, such as using a data terminal interconnected to the database.

Returining to the example situation, we assume that subscriber A is issued a personal location unit 12 similar to the vehicle unit taught in Freeny U.S. Pat. No. 4,209,787. The personal location unit 12 is carried on the person of subscriber A. The personal location unit 12 embodies a method of monitoring the location of monitored objects as is taught in Freeny U.S. Pat. No. 4,209,787. In the present invention the monitored objects are subscribers. The personal location unit 12 includes a person location code register 11. At all times the person location code register 11 has encoded therein a person location code comprising the Personal Locator Number (PLN) of the bearer of the personal location unit and a location number (LN) specifying the present location of the bearer. When the bearer is within the monitored area, the location number portion of the location code identifies the location of the bearer within the monitored area. Otherwise, the location number portion of the location code is a special LN signifying that the bearer is not within the monitored area.

Returning to the example situation, we assume that subscriber A moves from room 16 to room 15. In response to the change in location of the subscriber, the personal location unit 12 transfers the person location code from the person location code register 11 to a transmitter 8 via a signal path 10 and then to the base station 6 via signal path 9. In response, the base station 6 formulates a data message containing the digits "700", the person location code comprising PLN and LN, and the digits "119" (signifying a location update) and transmits the data message to the database 5 over the data communication network 7.

Again, data base 5 recognizes from the "700" digits that the received data message pertains to a LDPL type of call. Accordingly, program control is given to the location dependent person locator control program. With reference again to FIG. 2, the data base program, after translating the PLN portion of the data message into the LDPL table address, at designation 20 determines from the access code that the data message pertains to a location update. Hence at designation point 29 the program extracts the LN from the data message and stores it in row 0 of the LDPL table, after which the LDPL program returns to the main program at EXIT. Note that this is only one illustrative way of updating the location information in the data base.

From this time on until the information stored at data base 5 is again updated, all calls directed to PLN 583-1000 will be completed according to the information stored in the data base. For example, assume that while subscriber A remains in room 15, a caller B at station 30 initiates a LDPL completion call to subscriber A. Caller B keys into telephone switching office 2 from station 30 the digits "700-583-1000." The call is routed from the telephone switching office 2 to TSPS 4, which transmits a data message comprising the dialed information to data base 5, as is taught, for example, in Jordan and Weber U.S. Pat. No. 4,313,035.

With reference again to FIG. 2, the data base program, after translating the PLN into the LDPL table address, at designation 19 determines from the absence of an access code that a completion call is being placed to the LDPL subscriber. At this point, the program determines the manner in which the call is to be completed. This part of the flow diagram is shown at A in FIG. 3. At designation 31 the program fetches the current location number (CLN) of suscriber A from row 0 of the LDPL table. Next, at designation 32 the program translates the CLN into a memory address which is the address of the LDCCS row within the LDPL table. The result of the translation may be a null address, which signifies that subscriber A has not specified a call completion status for the CLN. At designation 33 the program checks for a null address. If the address is null then the program fetches the call completion status from the third row of the LDPL table at designation 34 and then continues to designation 36. In this case, the address is not null and the program, at designation 35, fetches the call completion status from the LDCCS row and continues to designation 36. At designation 36 in FIG. 3, the program interprets the call completion status to determine how the call is to be completed. In the example at hand, the call completion status indicates that the call is to be answered with a "not available" message. At designation 37 the program therefore formulates a verification message, including a "not available" indication. The message is transmitted to TSPS 4, after which the LDPL program returns to the main program at EXIT. In response to the verification message, subscriber B at station 30 is given a speech announcement as is taught in Jordan and Weber U.S. Pat. No. 4,313,035.

Returning to the example, suppose now that subscriber A moves from room 15 to room 16. In response to the movement of subscriber A, the CLN information in the database is updated to 223, the LN for room 16, as described above. Now suppose that caller B makes another call to subscriber A. This time, the call is completed to subscriber A by paging subscriber A, as specified in the call completion status in the LDCCS row for LN 223 in the LDPL table for PLN 538-1000, the PLN for subscriber A. Note that subscriber A does not have to make call completion update calls to change the call completion status each time subscriber A moves from one location to another.

Returning to the example, suppose now that subscriber A leaves the area monitored by the subscriber location indicating system 13. In response, the CLN information in the database is updated to a special LN which signifies that subscriber A is out of the area monitored by the subscriber location indicating system 13. Now suppose that caller B makes another call to subscriber A. This time, the call is completed to subscriber A by whatever method of call completion is specified in the LDCCS row for the special LN.

Numerous other enhancements may be provided for location dependent person locator service. An alternative signalling arrangement may be provided which is particularly useful for providing location dependent person locator service to callers who do not know or who have forgotten the PLN of a subscriber. This arrangement may be based on using the area code and directory number of a subscriber as the PLN rather than a "700" type number, as is taught in Jordan and Weber U.S. Pat. No. 4,313,035.

As another enhancement, a method of call completion may be provided that forwards a call to another PLN. For example, a subscriber A may specify that a call directed to himself be forwarded to the PLN of his secretary. Thus a call to subscriber A might be completed to his secretary even if his secretary is not at the station at which his secretary normally resides.

As another enhancement, in the case that a person is a subscriber to more than one location dependent person locator service, each covering a distinct monitored area, a method of call completion may be provided that forwards a call to a PLN defined within another LDPL system.

It is to be understood that the above-described arrangements are merely illustrative of the application of the principles of the invention and that numerous other arrangements may be devised by those skilled in the art without departing from the spirit and scope of the invention.

I claim:

1. A method of providing person locator service in a telephone system comprising a plurality of stations, one or more telephone switching offices, a data base, a subscriber location indicating system, a data communications network interconnecting said data base with said telephone switching offices, and a data communications network interconnecting said data base with said subscriber location indicating system, said method comprising the steps of:

responsive to changes in the location of a telephone subscriber, storing at said data base information specifying the location of the subscriber;

under direct control of said telephone subscriber, storing at said data base many items of information, each item relating a location or group of locations to a particular indicated status of the subscriber for telephone call completion while said subscriber is at said location or one of said group of locations;

responsive to a call from a first one of the stations to said subscriber, addressing said data base to examine the stored information specifying the present location of said subscriber;

responsive to a receipt of said information specifying the present location of said subscriber from said data base, addressing said data base to examine the stored items and detect one which indicates a relation of said present location to the particular indicated status of the subscriber for telephone call completion while said subscriber is at said present location; and responsive to a receipt of said item which indicates the relation of said present location to the particular indicated status of the subscriber for telephone call completion while said subscriber is at said present location from said data base, completing the call from said first station according to said detected item of information.

2. A method of automatically deriving location dependent person locator service data from a data base characterized by:

in response to information received from a subscriber position indicating system, storing said information at said data base, said information specifying the present location of an entitled subscriber;

storing at said data base information, said information specifying a plurality of associations between call completion methods and locations for each entitled subscriber, selection among said associations being dependent upon the present location of a particular entitled subscriber:

in response to control signals received from a communication system, addressing said data base to examine said information specifying the present location of said particular entitled subscriber:

addressing said data base to examine any method of call completion associated with said present location and pertaining to said particular entitled subscriber: and returning from said data base to said communication system coded data signifying said examined any method of call completion.

3. The method of claim 1 wherein the step of storing under direct control of the telephone subscriber many items of information comprises:

receiving from the subscriber many specifications, each specification specifying a location or a group of locations and a particular indicated status of the subscriber for telephone call completion while said subscriber is at said location or one of said group of locations;

storing at said database each said specification in an item relating said location or group of locations to the particular indicated status of the subscriber for telephone call completion while said subscriber is at said location or one of said group of locations.

* * * * *